Nov. 17, 1925.
C. G. TROSIEN
1,562,012
GEAR LOCK FOR AUTOMOBILES
Filed Oct. 25, 1923
2 Sheets-Sheet 1
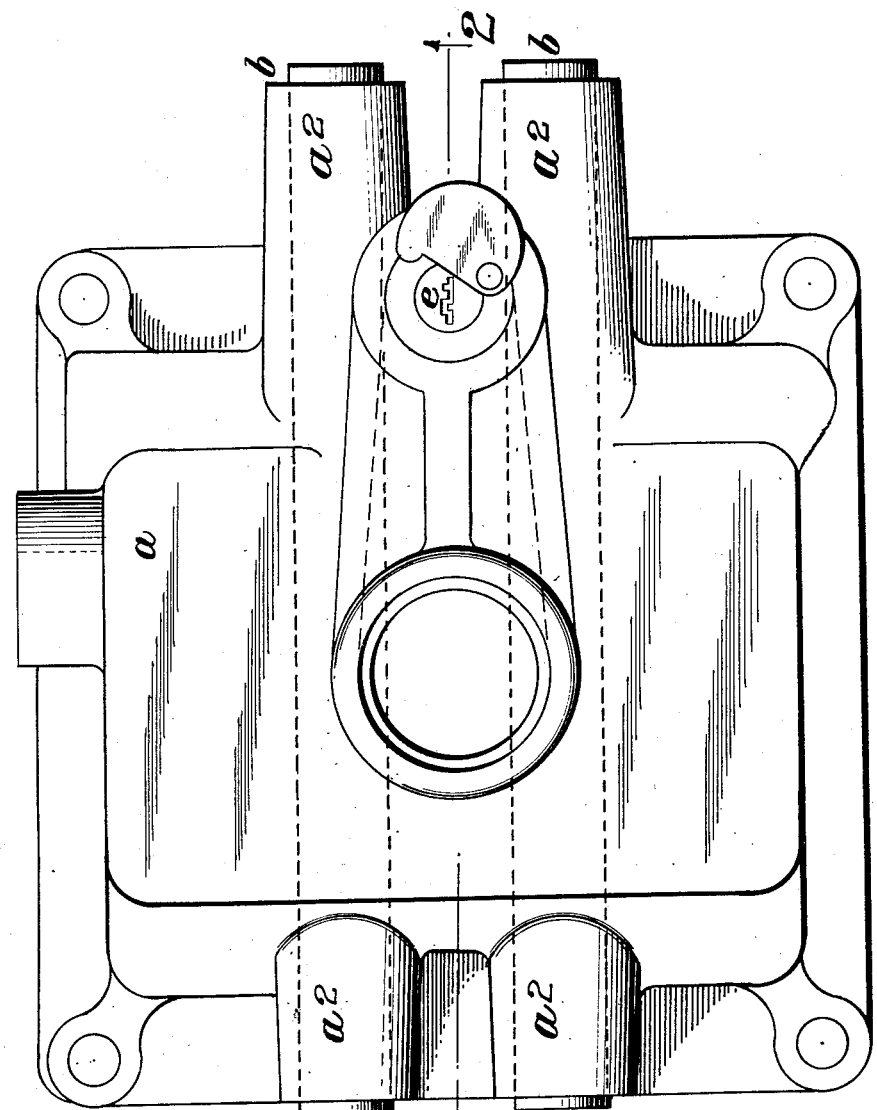
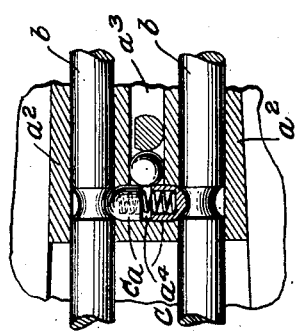
INVENTOR.
Charles G. Trosien
BY
E. J. Stoddard
ATTORNEY.

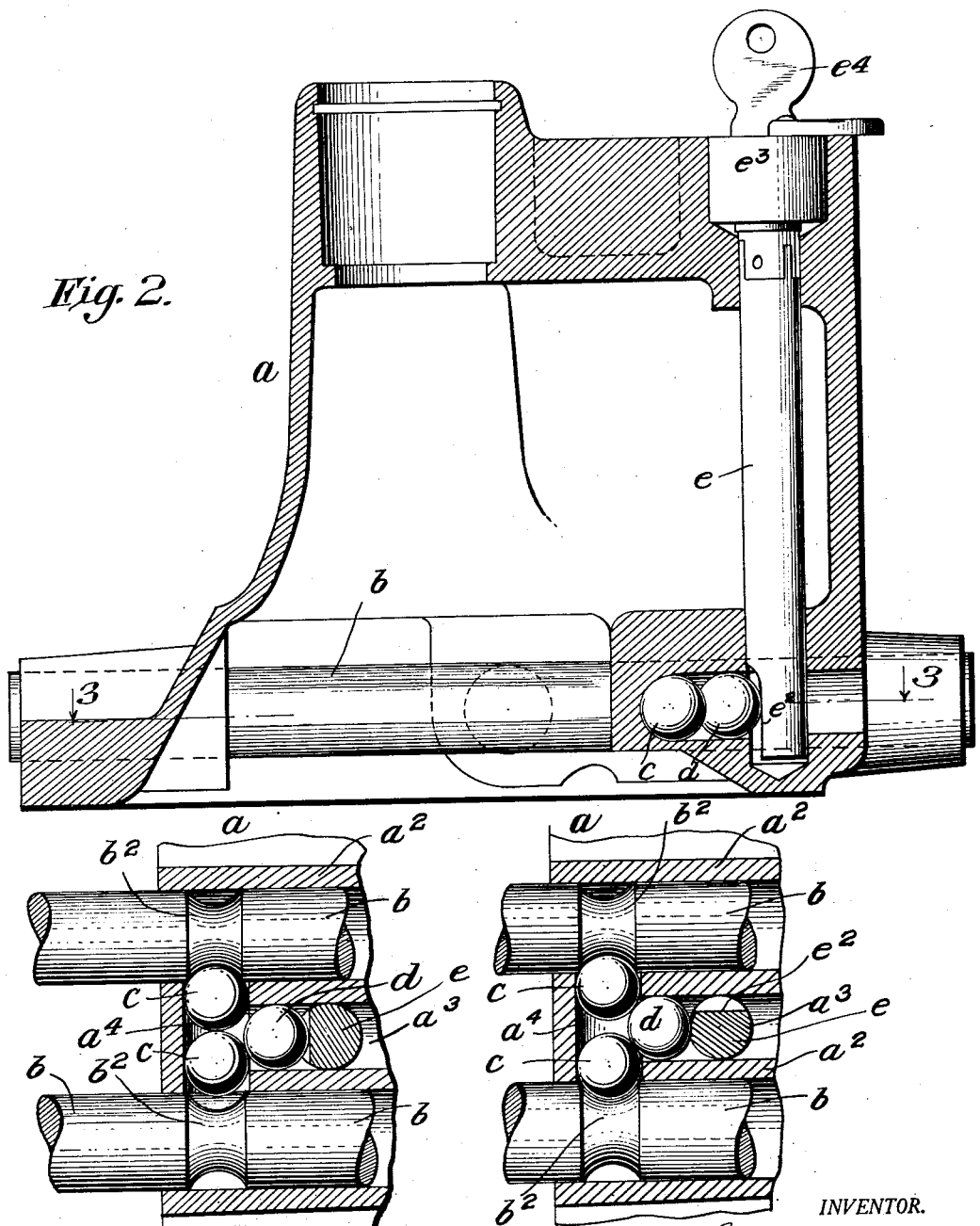

Patented Nov. 17, 1925.

1,562,012

UNITED STATES PATENT OFFICE.

CHARLES G. TROSIEN, OF PONTIAC, MICHIGAN.

GEAR LOCK FOR AUTOMOBILES.

Application filed October 25, 1923. Serial No. 670,801.

*To all whom it may concern:*

Be it known that I, CHARLES G. TROSIEN, a citizen of the United States, residing at Pontiac, county of Oakland, State of Michigan, have invented a certain new and useful Improvement in Gear Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles, and the object of my improvements is to provide a means for locking the change speed gearing of an automobile so as to prevent unauthorized use of the same that shall be simple and strong and easily adjustable to existing apparatus. I secure this object in the device illustrated in the accompanying drawings in which:—

Figure 1 is a plan view of a gear casing with shifting rods therein and an apparatus embodying my invention connected therewith.

Figure 2 is a section of the line 2, 2, Fig. 1.

Figure 3 is a horizontal section in a plane indicated by the line 3, 3, Fig. 2, showing the parts in locked position.

Figure 4 is a view similar to Figure 3 showing the parts in locked position.

Figure 5 is a view similar to Figure 3 showing a modified construction.

$a$, is a gear casing, having bearings $a^2$, $a^2$, $a^2$, $a^2$, for the shifting rods. $b$, $b$, are the shifting rods adapted to reciprocate in the bearings $a^2$, $a^2$, $a^2$, $a^2$.

The shifting rods $b$, $b$, are provided with peripheral grooves $b^2$, $b^2$, (Figs. 3, 4 and 5) which are opposite each other when the said rods are in their neutral position. $a^4$ is a cylindrical passage in the casing $a$, extending between $b^2$, $b^2$, $c$, $c$, are parts fitting and adapted to reciprocate in the passage $a^4$. These parts are of such a size in the direction of the passage $a^4$ that when one of said parts is entirely in said passage the other of said parts will be forced partly out of said passage to engage in a groove $b^2$ and hold a rod $b$, from movement from its neutral position. The parts $c$, $c$, may be balls as shown in Figs. 2, 3 and 4, or may be cylinders as shown in Fig. 5.

$a^3$ is a longitudinal passageway in the casing $a$, having its axis extending horizontally in the same plane as the axis of the passage $a^4$, and communicating with the latter at its center. $d$, is a part which may be a ball, as shown in the drawing, adapted to reciprocate longitudinally in the passage $a^3$.

$e$, is a cylindrical rod extending vertically downward from the top of the casing $a$, into the passage $a^3$, its axis preferably cutting the axis of said passage. The rod $e$ is cut away on one side at its lower end adjacent to the ball $d$, as indicated at $e^2$. $e^3$ is a pin lock barrel at the upper end of the rod $e$, adapted to be engaged by a key $e^4$ whereby the rod $e$, may be rotated about its axis, locked in a certain position, and unlocked.

The relative positions of the parts $c$, $c$, $d$, and $e$, are such that when the rod $e$ is turned with its cut away portion $e^2$ toward the ball $d$, as shown in Figs. 2 and 4, the ball $d$, may retreat into the passage or cavity $a^3$ leaving the balls $c$, $c$, free to move in the passageway or cavity $a^4$, and when the rod $e$ is turned so that the cut away portion $e^2$ is at a different position as shown in Fig. 3, the surface of the rod $e$, engages the ball $d$, forcing said ball between the balls $c$, $c$, and holding both of the latter in position at which they engage in the grooves $b^2$, $b^2$, and lock the shifting rods $b$, $b$, in their neutral position. The lock $e^3$ is adapted to secure the rod $e$, in this position.

In Fig. 5, I have shown cupped cylinders $ca$, $ca^4$, with a spring interposed between them in place of the balls $c$, $c$.

The passage $a^4$ is found in conventional constructions and the passage $a^3$ may be easily bored in from the end of the casing. The rod $e$ has its upper end at a convenient and accessible point and its bearings may be easily formed in existing constructions.

I claim:

1. In a change speed gearing having a casing and two shifting rods reciprocating in bearings in said casing, a horizontal transverse passage extending between said rods, two loose reciprocating parts in said passage adapted to engage said rods, a horizontal longitudinal passage, a loose part adapted to reciprocate in the last named passage, and a vertically extending cam rod adapted to actuate the part in the longitudinal passage to project the same into said transverse passage and cause the parts in the latter to engage said rods.

2. In an apparatus of the kind described two parallel reciprocating rods with their axes in a horizontal plane, a passage extending between said rods, said rods being cut away at points which are opposite the ends of said passage at the neutral position of said rods, a second passage with its axis in a horizontal plane joining the first named passage toward the center thereof, reciprocating locking parts in the first named passage, a reciprocating part in the second passage adapted to engage the parts in the first named passage to hold them in engagement with the grooves of said rods or to be disengaged from said locking parts and a rotatable rod extending into the second passage and provided with a cam surface adapted to engage the part in said second passage to force it into locking position or to release the same, and means for locking said rod in its adjusted position.

3. In a change speed gearing having a casing and two shifting rods reciprocating in bearings in said casing, a horizontal transverse passage extending between said rods, two loose reciprocating parts in said passage adapted to engage said rods, a horizontal longitudinal passage, a loose part adapted to reciprocate in the last named passage and a cam adapted to actuate the part in the longitudinal passage to project the same into said transverse passage and cause the parts in the latter to engage said rods.

4. In a change speed gearing having a casing and two shifting rods reciprocating in bearings in said casing, a horizontal transverse passage extending between said rods, two loose reciprocating parts in said passage adapted to engage said rods, a horizontal longitudinal passage, a loose part adapted to reciprocate in the last named passage, and a vertically extending cam rod adapted to actuate the part in the longitudinal passage to project the same into said transverse passage and cause the parts in the latter to engage said rods, said longitudinal passage being bored in from the edge of said casing.

In testimony whereof, I sign this specification.

CHARLES G. TROSIEN.